United States Patent Office 2,857,805
Patented Oct. 28, 1958

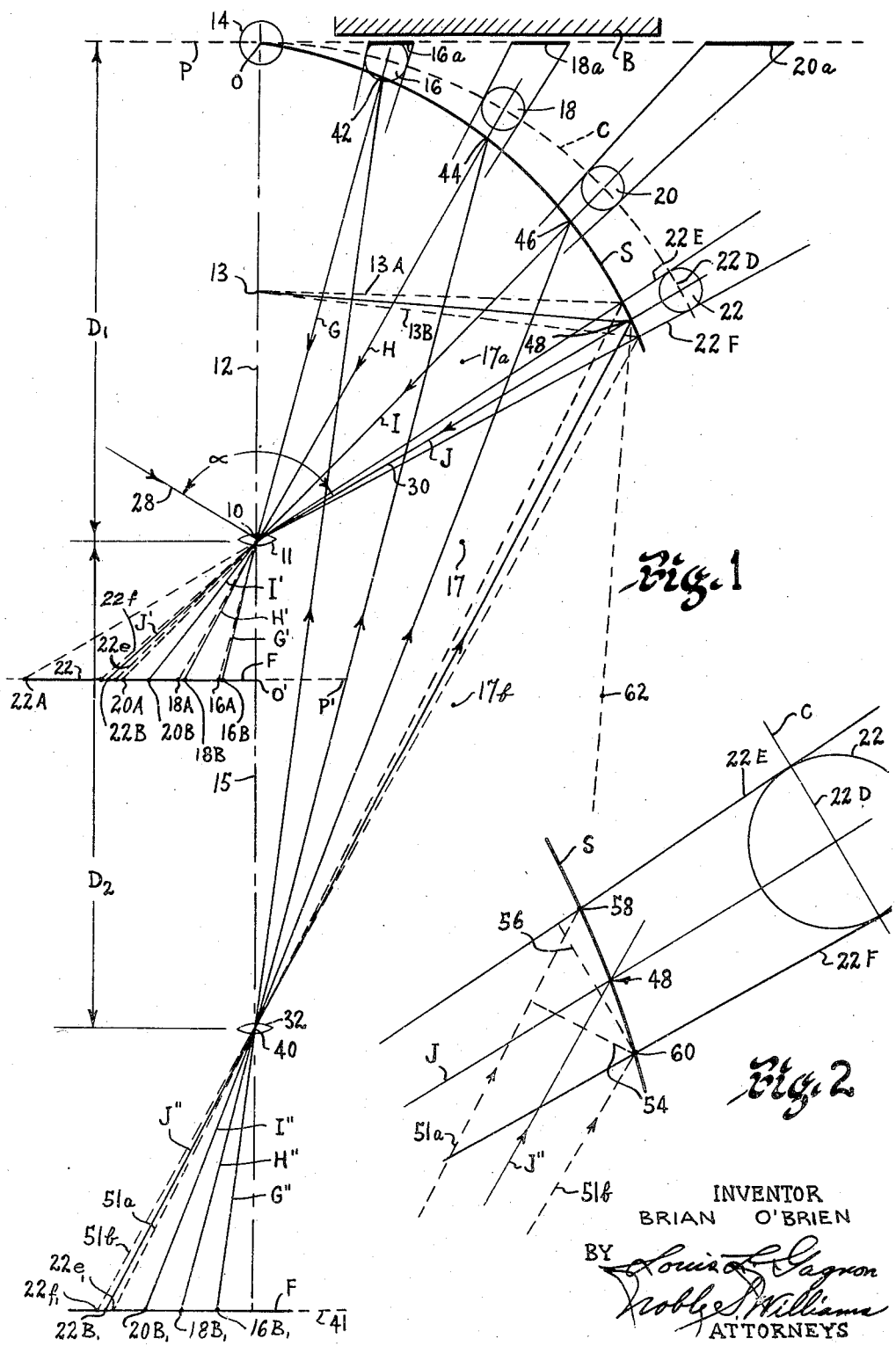

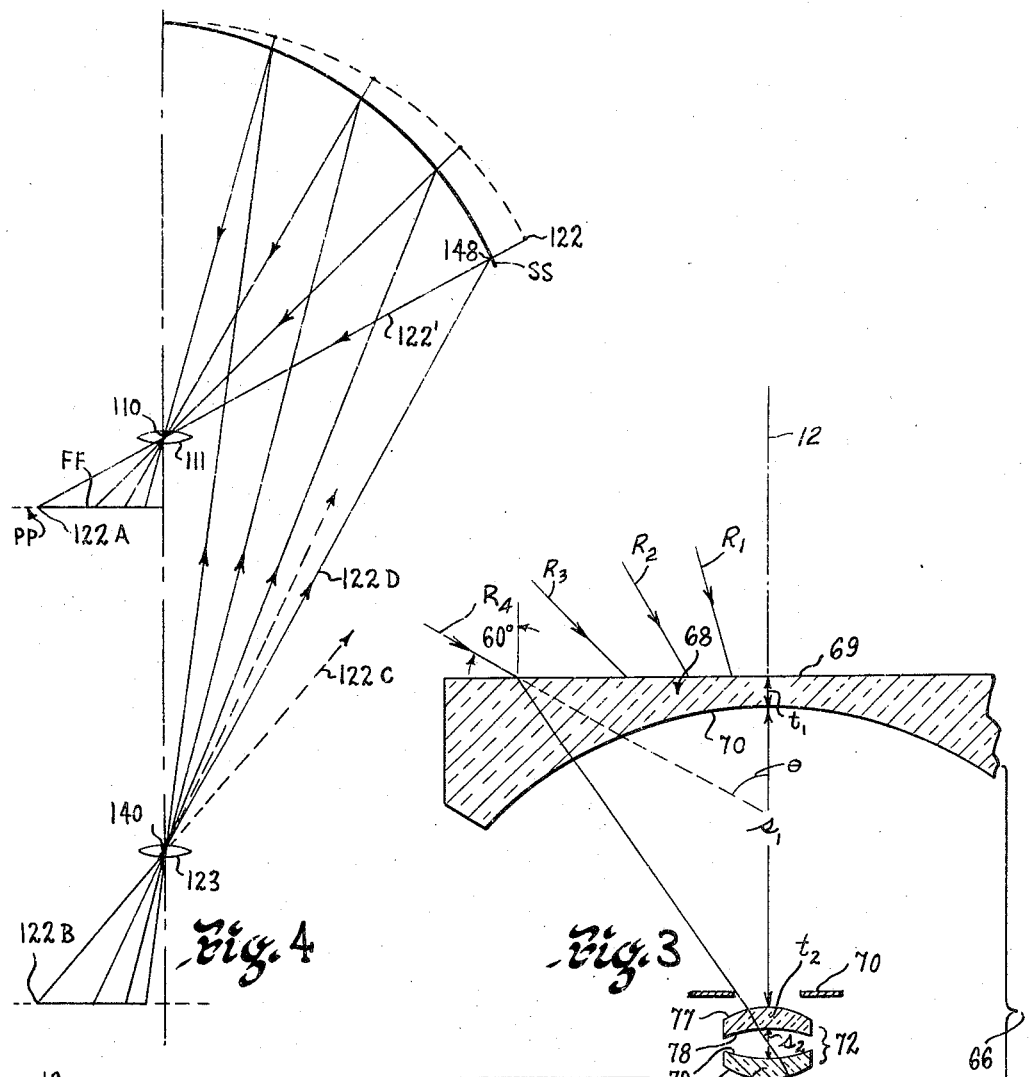

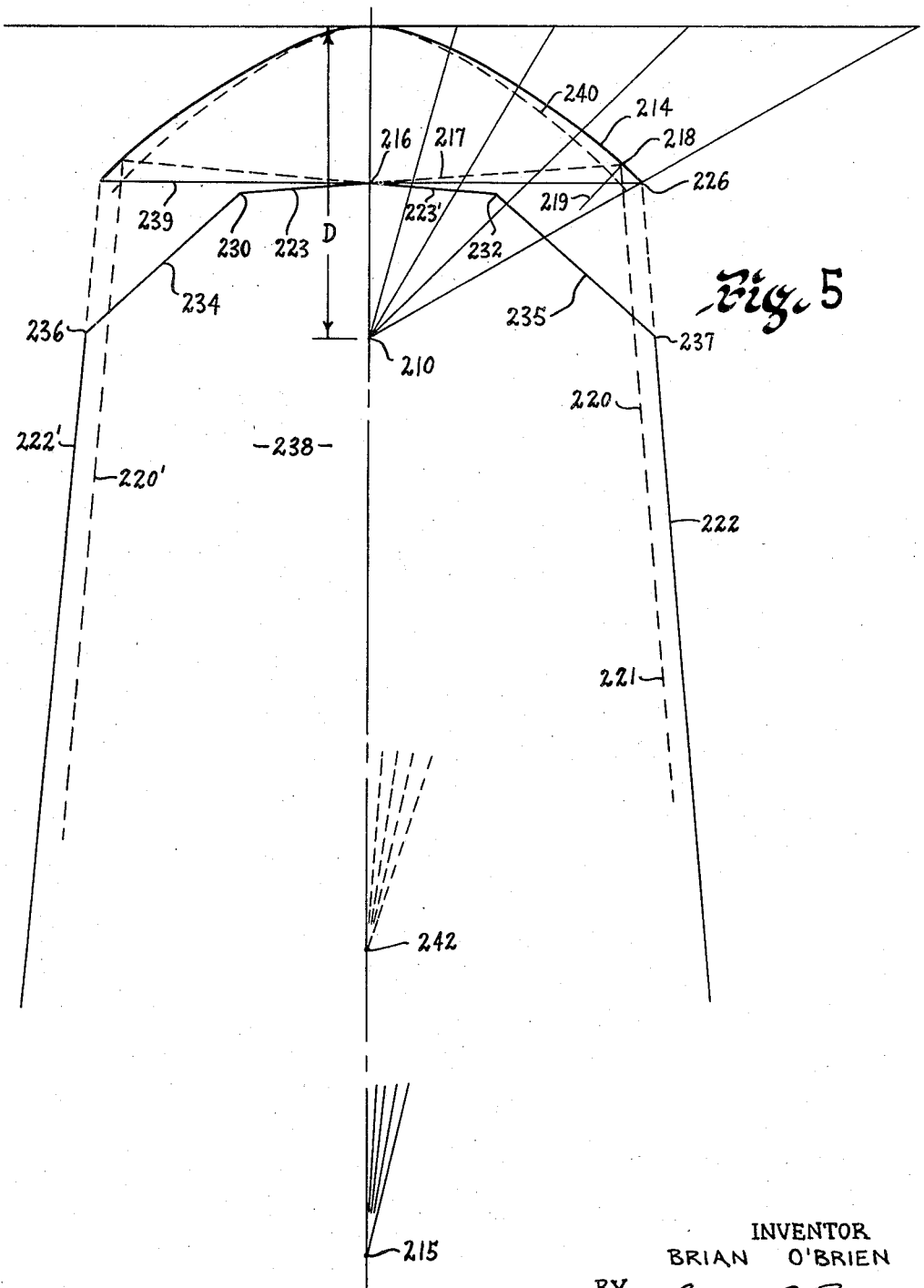

2,857,805

MOTION PICTURE THEATER SYSTEM

Brian O'Brien, Pomfret, Conn., assignor to American Optical Company, Southbridge, Mass., a voluntary association of Massachusetts Application April 6, 1953, Serial No. 346,953

9 Claims. (Cl. 88—16)

This invention relates to systems for producing wide angle pictures and more particularly to a composite system comprising a camera, a projector, and a viewing screen constructed and arranged to function in combination with each other in the photographing of and the subsequent projection of wide angle pictures in a manner which will provide, to persons of an audience positioned to view the screen, pictures which are for the most part substantially free from distortion and which give to the observers a feeling of depth; as if he or she were actually sitting within the scene being projected. The composite system of the present invention is primarily intended for use with motion pictures but might very well be used for still picture projection if desired.

It is an object of the present invention to provide novel means and a method of controlling the distortional characteristics of images to be viewed on a wide angle theatre screen in accordance with the various objects and principles defined herein.

When persons viewing a wide angle or panoramic picture (particularly of a motion picture type) being projected onto a cylindrically curved screen, are located at or near the center of curvature thereof, a depth effect is forcefully created in their minds. This effect is in a large sense due to the fact that side or peripheral vision greatly influences the psychological impressions being formed both from the direct viewing of the parts of the picture where the main action is taking place and from the indirect side vision of parts of the picture at either side thereof. Generally speaking, the main action is located near the center of the picture and directly in front of the audience, but not necessarily so. Nevertheless, a person's pheripheral vision is highly sensitive to motion whether it occurs at one side or the other or even at both sides of the observer at the same time. Furthermore, when sound is also present and coupled with the action of the scenes through the medium of a plurality of loud speakers strategically located near different parts of the screen and even at locations rearwardly of and at opposite sides of the audience and operated from different sound tracks, or the like sound means, synchronized with the motion on the screen, this depth effect and feeling of being within and a part of the picture becomes very impressive and realistic indeed.

Heretofore, wide angle photography and projection have been tried but have not been entirely satisfactory for different reasons. For example, panoramic still or motion pictures of wide angular values have been projected onto cylindrically or semi-cylindrically curved screens by a plurality of projectors located near or projecting through the center of curvature of the screen, but this arrangement has been far from satisfactory since the projection equipment for such an arrangement of necessity was located either substantially at the center of curvature of the screen or so as to project through this center and required valuable space which might otherwise have been available for seats for the audience.

Furthermore, equipment of this type employed a number of projectors for projecting the adjacent wide angle pictures to effect the panoramic view but matching or merging of adjacent edges of adjacent pictures in such cases has been difficult and the result not entirely satisfactory.

The present invention, by the use of a co-related and carefully controlled composite system including a camera, a projector and a viewing screen constructed and arranged to work together, has removed to a very great extent the objectionable conditions of earlier wide angle projection systems. Improper merging of laterally adjacent pictures has been eliminated, no projection equipment occupies desirable space in the seating area and obstruction of vision is avoided. Even the expense and problems of operating a plurality of cameras and a plurality of projectors simultaneously has been removed.

It is, accordingly, an object of the present invention to provide a composite system comprising a camera, a projector and a curved viewing screen arranged to function with each other whereby wide angle pictures substantially free from or well corrected for distortion may be viewed by an audience located in a seating area located substantially at or near the center of curvature of the projection screen and without having the projection equipment located in or near the said area, or occupying desirable seating space in this area.

It is an object of the invention to provide wide angle cinematography to as large an audience area as possible for a selected camera, projector, projection distance and curved screen design while providing distortion-controlled screen images of high qualities for all viewing positions within said audience area.

A camera taking pictures will at times be focused upon near objects, such as persons acting within a room, and at other times on objects further away, such as action shots on a football field; and regardless of the distance from the camera to the principal location of action on the scene being photographed, the person in the audience later viewing this action should always have the sensation or feeling that he or she is at the position at which the camera was located at the time the picture was taken. It is accordingly an object of the invention to provide a composite system which will give such a feeling of depth to persons seated within the audience area of the theatre.

Another object is to provide a screen whose transverse irregular curved shape is developed about an optical center simulating the position at which a camera having a wide angle lens system possessing controlled distortional characteristics was located when the images to be projected on said screen were photographed, said irregular curvature of said screen being such that when said images are projected thereon by a projector located at a controlled distance from said screen and having a distortion-controlled lens system, the distortional characteristics of said images, particularly the foreground images, as viewed by any individual within a controlled audience area will not exceed 30% of the normal characteristics thereof.

It is also an object of the present invention to provide a combined system including a camera, a projector and a curved screen constructed and arranged to function together in the taking of wide angle pictures and the projection of these wide angle pictures onto the screen for viewing by an audience of appreciable size located near or about the approximate center of curvature of the screen while said projector is disposed an appreciable distance rearwardly of said center and rearwardly of the audience, and with all parts of the picture on the screen, including marginal portions thereof near the opposite side edges of the screen, being substantially free from distortion to persons in various parts of said audience.

Other objects and advantages of the invention will become apparent from the detailed description which follows when taken in connection with the accompanying drawings, in which:

Fig. 1 is a diagrammatic showing of a system embodying principles of the present invention;

Fig. 2 is an enlargement of a portion of Fig. 1;

Fig. 3 is a wide angle lens system which may be advantageously employed in carrying out the present invention;

Fig. 4 is a view similar to Fig. 1 illustrating a modified form of the invention;

Fig. 5 is a diagrammatic plan view of a theatre layout in accordance with the lens system set forth in Fig. 3; and Fig. 6 is a chart setting forth the distortional characteristics of the lens system of Fig. 3.

Referring to the drawings in detail and particularly Fig. 1, it will be seen that if a central point 10 were occupied by a lens system 11, such as a camera lens for taking a picture, that its optical axis 12 would extend forwardly therefrom as indicated by the dot-dash line. If the lens system 11 is substantially free from distortion (or is well corrected for distortion), and is focussed so as to have its object plane P passing through an axial point O a distance D therefrom, an image plane P' conjugate to this plane will pass substantially through an image point O' on the axis 12 conjugate thereto. If the solid line F represents a portion of a flat photographic film disposed in the image plane P', then any substantially flat object located substantially parallel to the object plane P, such as the front wall of a building represented by the heavy line B, may be photographically recorded upon the film F. When the recorded image on the film is thereafter reprojected back through this or an equivalent lens system, as might be the case in a theater projector for instance, a true substantially rectilinear picture of the front wall of the building would be produced upon a flat screen (not shown) if disposed in this plane P.

However, if similar objects, for example spheres 14, 16, 18, 20 and 22 are chosen and disposed within the view being photographed by the distortion-free lens system 11, with object 14 having its center located upon the optical axis 12 and the other objects 16, 18, 20 and 22 disposed with their centers spaced different angular amounts laterally from the axis, but with all of these objects equally spaced from the lens system 11, images of these laterally spaced objects 16–22 will be formed substantially at the image points 16A, 18A, 20A and 22A respectively. The points indicate the intersection of the dotted line extension of lines G, H, I and J respectively, extending from the centers of the objects 16, 18, 20, and 22 through the point 10 and to the photographic film F. However, if the images of these objects on the film are reprojected by the lens system 11 onto the flat screen in the plane P, the respective images of the similar objects would look dissimilar, except to an observer located close to the lens system 11. To an observer located some distance forward or behind the lens system 11, each of the images would have a different transverse dimension as clearly indicated by the heavy lines 16a, 18a and 20a, notwithstanding the fact that the face of the building B would be substantially free from distortion.

If these similar objects 14–22 were in fact people in the foreground of the scene being photographed, any distortion is their images upon the screen as seen by an observer would be most noticeable; for it must be appreciated that the images of people (within a motion picture, for example) will dominate and will be far more important from the standpoint of distortion to one viewing the screen than will be distortion in any other part of the picture such as in most distant and abstract objects.

Thus, if a cylindrical screen were used for displaying the images being projected from the film F and arranged to follow the dotted curve C concentric with point 10, much less distortion would appear to an observer thereof. This is the case whether he be seated substantially at the point 10, which we may call the optical center of the theatre, or even at a position 13 nearer the center of the screen O or at a point 15 as far from the point 10 in the opposite direction. Even to an observer well to one side of the point 10, as indicated at 17, or even nearer or farther from the screen as at 17a or 17b, the appearance of the images of people will be far more satisfactory with the circular screen C than with a flat screen. However, as previously stated, wide angle projection from a film projector or projectors located in a projection booth at or near the center of curvature of such a screen and thus near the center of a theater audience would be objectionable. It would require considerable space ordinarily available for seating purposes, would block off parts of the screen from persons occupying seats near or behind such a booth, and might cause objectionable noises. Furthermore, if a plurality of cameras and projectors are used for taking and subsequently showing of such wide angle pictures, the difficulties of properly joining or merging of the edges of adjacent pictures will still be present. On the other hand, if a single film and a single wide angle camera and associated projection system can be used to project from a location rearwardly of the audience onto a curved screen more or less similar to that following curve C with satisfactory results and freedom from distortion as viewed from the audience area, the mentioned objections to present-day wide angle multiple projector systems could be eliminated. Also such an improved system as is to be found in a present-day conventional motion picture theater could be easily and advantageously adapted for use with such a new improved composite wide angle system and, if desired, strategically coupled with a number of loud speakers individually controlled therefrom.

It has been found that, by following the teachings of the present invention, improved results can be obtained by the use of a single wide angle camera, a single projector and a related curved viewing screen and thus the difficulty of merging adjacent pictures to form panoramic views will be avoided. Referring again to Fig. 1 of the drawings it will be seen that the lens system 11 at point 10 might be intended for photographing a wide angle field such as indicated by the angle α comprehended between the lines 28 and 30 and disposed equal angular amounts from the optical axis. The objects 16, 18, 20 and 22 have been purposely placed for discussion at equal distances from the camera and laterally dispersed 15°, 30° 45° and 60°, respectively, from the axis 12 in order to aid one in obtaining a clear understanding of the invention.

If the lens system 11 for taking such a wide angle picture is carefully controlled to provide a definite amount of "barrel" distortion at the short conjugate, instead of being distortion-free as mentioned supra, and if at the same time this lens system is carefully corrected for other well known aberrations, such as spherical and chromatic aberrations, then central rays such as J, I, H and G will be deviated inwardly as indicated at J', I', H' and G' and the associated images will be caused to impinge upon the film F at points nearer the optical axis 12 (and thus nearer the center of the film F, since the center of the film would be at the optical axis). Point 22A will be displaced inwardly an appreciable amount to a new location 22B, point 20A will be displaced inwardly a lesser amount to a new location 20B, and point 18A displaced inwardly a smaller amount still to a new location 18B and point 16A the least to new point 16B. Thus, it will be appreciated that the nearer the rays forming the picture are to the outer edges of the picture, the more such rays will be bent inwardly to provide for the controlled distortion desired.

If the film F with the distorted images of the objects 16, 18, 20 and 22 thereon, for example, is subsequently placed at the focal plane 41 in a projector having its objective 32 located at a predetermined axial point 40, these image points on the film F will be disposed at the places indicated by numerals $16B_1$, $18B_1$, $20B_1$, and $22B_1$, respectively. If the projector has a substantially distortion-free projection objective (or one well corrected for distortion) lines G″, H″, I″ and J″ from these new image points and passing through the objective 32 without deviation will intersect their respective lines G, H, I, and J extending from the centers of the objects 16, 18, 20 and 22 to the point 10 at points which may be marked 42, 44, 46 and 48 respectively. The axial distance from the point 10 to the plane P is indicated as $D_1$ and in Fig. 1 the axial distance $D_2$ from the point 10 rearwardly to axial point 40 has been taken for the sake of the present discussion as an equal amount.

If the correct amount of this "barrel" distortion has been introduced into the picture on the film F by the camera lens system 11 during the taking of the picture, then the points of intersection 42, 44, 46 and 48, it will be seen from the following description, will establish locations at which surface portions of a screen could be located to intercept the projected images of objects 16, 18, 20 and 22 while providing the wide angle picture field desired.

Where distortion is present in a lens system, it increases in magnitude as the distance from the center of the field increases and we take advantage of this fact in the present invention. For this reason, we will now refer to outermost circular object 22 as shown in Figs. 1 and 2. It will be seen that the transverse diameter 22D of object 22 as indicated upon the circular curve C would be the same size as the transverse diameter for the object 14. Outermost rays 22E and 22F from the ends of diameter 22D travel towards point 10 when the picture is being taken by the distortion introducing lens system 11, and are deflected inwardly in a manner similar to central ray J′ so as to impinge upon the film F at points 22e and 22f respectively.

When the film is later located at the plane 41 in the projector having the objective 32, and central light ray J″ from the point $22B_1$, and the rays 51a and 51b from the outermost points indicated by $22e_1$ and $22f_1$ are projected back through the objective 32 and toward a viewing screen S, they will approach the screen in spaced relations to each other, which spaces are of lesser amounts of controlled values than the corresponding rays 22E, J and 22F originally. This will be readily seen in Fig. 2 wherein the dotted line 54 normal to the central ray J″ is of appreciably shorter length than is the dotted line 56 normal to the original central ray J. However, since the rays 51a, J″ and 51b are approaching the point of intersection 48 at an angle which is appreciably less than a right angle, the size of the image of the object 22 formed thereby will be in the transverse direction thereof appreciably "spread out." When the viewing screen S is arranged to pass through the series of established points 42, 44, 46, 48 as well as center point O and a limited outer portion thereof (see Fig. 2) is observed, it will be seen that the horizontal length of the screen surface between points 58 and 60 established by the rays 51a and 51b impinging upon the screen appear to have the same horizontal length as the line 22D insofar as an observer at or near point 10 is concerned.

If the axial point 13 is assumed to be approximately one-half of the way from the center point 10 to the screen center O, and is taken as the nearest point to the screen which can be satisfactorily occupied by an observer insofar as nearness to the screen and also horizontal image distortion or foreshortening from the outer edge of the screen are concerned, as indicated by lines 13A and 13B, it will be seen that some outer position 62 may likewise be established and if occupied by the observer substantially the same results as to horizontal image foreshortening will be observed. The establishment of a preferred audience area will be hereinafter more fully described.

In Fig. 3 there is shown a wide angle camera objective 66 which may be used advantageously for taking pictures having a predetermined amount of controlled distortion therein such that the photographic record obtained thereby may be employed in a projector in effect located at a distance from the viewing screen equal to approximately three times or four times, as preferred, of the distance the camera was originally from the scene being photographed, for providing an element which is to function cooperatively with a controlled curvature of the screen and a controlled shape of audience area, whereby the extent of distortion of the ultimate image as viewed on the screen may be controlled.

The lens system of Fig. 3 comprises a strongly negative front lens component 68 formed of a lens medium having an index of refraction of 1.523. This component has a front plane surface 69 and a concave rear surface 70 of a radius of curvature of 75.0 mm. The thickness $t_1$ between the front and rear surfaces of this component is 6.0 mm. Spaced rearwardly thereof is an iris diaphragm 70 and immediately rearwardly of this diaphragm is a front element of a companion set of meniscus components 72, each formed of a lens medium having an index of refraction of 1.523. The front meniscus component of this companion set is spaced axially a distance $s_1$ of 60.0 mm. from the rear surface of the lens component 68. The front surface 77 of the front meniscus component has a convex curvature having a radius of 15.4 mm., while the concave rear surface 78 of this component is spaced from the front surface 77 an axial distance $t_2$ equal to 4.0 mm. The surface 78 has a concave curvature of a radius of 24.0 mm. The rear meniscus component of this companion set 72 is similar to the front meniscus component thereof but is arranged in a reversed position so that its forward concave surface 79 will be spaced an axial distance $s_2$ equal to 6.0 mm. from the rear surface 78 of the front meniscus component. The indices of refraction of both meniscus components is 1.523 and the thickness $t_3$ of the rear meniscus component is equal to the thickness $t_2$ of the forward meniscus component. The rear surface 80 of the rear meniscus component is spaced 44.0 mm. from the image plane 76, which spacing is indicated by the axial dimension $s_3$.

In a somewhat similar approach to the problem of distortion-free pictures for an audience located in the vicinity of the central point 10, it would be possible in the original taking of motion pictures to use a camera lens system well corrected for distortion and to thereafter project the resulting distortionless pictures through a projector having controlled "cushion" distortion, controlled in accordance with the location at which the projector is being used and in accordance with the curvature of the viewing screen to be employed. (It will be noted that "barrel distortion" is defined herein in the usual manner, in that an image formed at the short conjugate focus will be barrel-shaped if the object located at the long conjugate is of rectangular shape.)

The resulting image upon the viewing screen of carefully controlled curvature to agree with the introduced distortion of the projector objective, would provide in like manner natural appearing images well corrected for distortion for persons seated near the optical center of the theatre. This may be better seen by reference to Fig. 4 wherein a diagrammatic showing appears, and wherein no distortion is provided by the camera lens system 111 located at central point 110. The ray 122′ from object 122 will pass through lens system 111 undeviated. The film FF with the pictures thereon may then be transferred from the camera (focal plane PP) to the projector having a projection objective 123 with controlled "cushion" distortion located at point 140. If an object 122 is imaged at 122A on film FF, this point would fall at 122B when placed in the projector. If a distortion-free objective were then used for projection, it would direct the ray from 122B along path 122C. However, the controlled distortion of the lens system 123 is such that the bundle of rays from 122B is deviated inwardly as indicated by line 122D. The point of intersection 148 of lines 122' and line 122D would determine the location for a point on the viewing screen SS.

The first-described system of the type in Fig. 1, however, is generally preferred since, as will be readily seen, the second described system requires a wider film at FF.

It follows from the foregoing that since the controlled distortion may be introduced by either the camera objective or the projector objective to work at a proper distance with a curved screen of proper design, it would be possible to provide a combination wherein part of the desired distortion could be introduced by the camera objective and part by the projector objective, with the end result being substantially as before: namely, the resulting image upon the curved and carefully controlled viewing screen working therewith providing substantially distortion-free pictures or well corrected pictures to persons viewing the pictures on the screen.

While the projection distance has been indicated in Figs. 1 and 4 as equal to twice that for the central point 10, it should be noted that other projection distances can be employed satisfactorily. For example, the projection distance can be taken as equal to three times the distance D or four times the distance or more, if desired. However, the curvature for the viewing screen would be somewhat less for the longer projection distances as will later appear. Of course, the principles of the invention would be followed in determining the desired screen curvature for such a composite system.

It should be appreciated that there are two factors of importance in such an optical system which should be considered, namely, closeness of spectator to the viewing screen and the relative angularity between the various limited or unit areas on the screen and spectators viewing the same. Relative angularity will determine the amounts of distortion or foreshortening effect of screen image in the horizontal direction which will be present and which must be taken into consideration for obtaining preferred results. If we are to assume that a foreshortening effect in a screen image of a foreground object (for example, the face of a person) in amounts not more than 30% in the horizontal direction, relative to the undistorted value thereof will be within preferred limits, it can be shown that a theatre area or seating area of appreciable size having good viewing qualities may be established.

In Fig. 5, for example, there is diagrammatically illustrated a theatre layout for a wide angle projection system using a refractive lens system, such as shown in Fig. 3, having carefully controlled amounts of distortion. The optical center of the theatre is indicated by the numeral 210 and corresponds generally to the point 10 in Fig. 1. Point 210 has been taken as equal to the distance D from the center of the screen and the screen curvature which is an irregular curvature, and indicated by full line curve 214, is for a projection distance of 4D, as indicated by projection point 215 and for a substantially distortion-free projection lens system.

If a spectator located at a central point 216 and looking at the screen along line 217 bears an angular relationship to a unit area or point 218 near the margin of the screen at which he might direct his vision, it can be mathematically shown that the lateral dimensions of an image on the screen, for example, the face of a person, will have in the horizontal direction thereof a foreshortening effect of approximately 30% or lineal values in the horizontal direction of approximately 70% of the undistorted values thereof. The vertical dimensions of this image, on the other hand, will remain substantially free from distortion to the spectator at point 216. Likewise, if the same angular relation exists between the screen at unit area or point 218 and a line 220 drawn from point 218, but to the opposite side of a line 219 normal to the screen at this point, it will be seen that for any location along this line 220, the amount of foreshortening of the image in the horizontal direction thereof will be substantially the same as that experienced by a spectator viewing from point 216. While a spectator at any selected point upon line 220, such as point 221, may be appreciably further away from the screen than a spectator at point 216, the screen image at 218 will appear as free from distortion to the one spectator as it is to the other. In Fig. 5 a line 222 has been drawn parallel to line 220 and arranged to pass through the outer edge 226 of the screen 214 and thus this line 222 will indicate generally the lateral limits of a preferred audience area from which image distortion upon the screen appears to be well corrected or controlled.

It will be noted that a solid line extension of line 217 is indicated at 223. Any spectator seated along the solid line portion 223 will experience the same controlled image distortion characteristics on the screen at point 218 as did the person at 216. Point 230, on this solid line extension 223, however, may be taken as a point which is as close to the screen as might be reasonably acceptable for good viewing results. This near screen point 230, it will be seen is approximately one-third of the distance D, and will give acceptable viewing to a spectator for theatres using screens of average height. Point 232 at the opposite side of the theatre may be established in like manner.

Lines 234 and 235 have been drawn outwardly from points 230 and 232, respectively, and substantially parallel to the general directions of the adjacent outer regions of the viewing screen 214. These lines intersect side lines 222' and 222, respectively, at points 236 and 237. Thus, lateral limits of a preferred viewing area 238 having limited amounts of foreshortening may be established. Points within this preferred area 238 and further from the screen than previously mentioned point 230 and along the line 234 will have better viewing conditions insofar as image distortion is concerned. It is quite obvious that any individual seated within the confines of this acceptable area and further from the screen will have less distortion in images being viewed on any part of the viewing screen. Of course, persons seated rearwardly of the point 210 encounter the usual limitations as to diminution of image size.

With an arrangement such as that set forth in Fig. 5, which has been designed to function with a camera lens system having a wide angle of approximately 120 degrees, the maximum distortional characteristics of any image as viewed on substantially any part of the screen and from nearly any part of this area 238 will be no greater than 30% of the normal undistorted value of said screen image.

There is shown at 240 a dotted line curve which indicates the preferred viewing screen curvature for the wide angle lens system of Fig. 3 when a projection distance of 3D is employed (projector located at point 242), instead of the projection distance of 4D described above. Thus it will be seen, shorter projection distances in effect "pull forwardly" the outer portions of the curved viewing screen while longer projection distances in effect "push back" the outer portions thereof.

The preferred audience area 238, under the conditions set forth in connection with Fig. 5, will have the minimum forward central point 216 at a distance from the screen of approximately ½D. Starting at this central point, the area may be defined by lines 223 and 223' angling outwardly and rearwardly to side points 230 and 232 which are at a distance from adjacent parts of the screen of approximately ⅓D. The lines 234 and 235 then extend from these points outwardly and rearwardly substantially parallel to the adjacent outer regions of the screen, which lines intersect rearwardly and outwardly extending side lines 222' and 222 passing through the outer edges of the screen. Each side line 222' and 222 is at an angle of approximately 5 degrees with respect to a transverse plane 239 connecting the edges of the screen.

It is to be understood in accordance with the teachings set forth above that the shape of the screen and the size and shape of the audience area will change for different projection distances even though the camera and projector remain the same.

It is further pointed out that for substantially any small unit area of the viewing screen, the viewing angle between the line of sight of the spectator and the screen for any spectator within the audience area set forth above, should not be less than an angular value of 45 degrees.

In Fig. 6 there is shown a chart on which image ray height values outwardly from the optical axis 12 relative to a short conjugate distance of unity for the lens system of Fig. 3 (or in other words the natural tangent values for the angle $\theta'$) have been indicated in a vertical direction, and natural tangent values for rays entering at a variable angle $\theta$ (such as rays $R_1$, $R_2$, $R_3$ and $R_4$ in Fig. 3) have been given in a horizontal direction. The chart shows a dotted line "curve" 244 which would result if a distortion-free lens system were being disclosed. However, the curve 245 is indicative of the actual distortion conditions existing for the lens system of Fig. 3. Since light rays up to 60 degrees in angular value, to either side of the optical axis 12, enter the system, rays $R_1$, $R_2$, $R_3$ and $R_4$ of angular values of 15°, 30°, 45° and 60° have been indicated. The natural tangent for the 15° entering ray $R_1$ if undistorted would be 0.268. However, this ray on the short conjugate side is distorted and thus the distortion curve 245 for this system will indicate at point 71 a value of 0.250 for the image height. A 30° angle for the entering $R_2$ has a natural tangent of 0.577 while an image height for this ray of 0.490 on the short conjugate side is indicated at point 75 by distortion curve 245. The natural tangent for the 45° entering ray $R_3$ is 1.000 while the curve 245 indicates at point 77 an image height on the short conjugate side of 0.730. The natural tangent for the 60° ray $R_4$ is 1.732 while the image height is indicated at 79 on the distortion curve as equal to 0.99. (The arrow 76' in Fig. 3 indicates the distorted ray height for the 60° ray.) Thus, it can be demonstrated from these ray height values that the 15° entering ray is 94% distortion-free at the image plane 76, the 30° entering ray is 85% distortion-free at image plane 76, that the 45° ray is 73% distortion-free and the 60° ray is 57% distortion-free.

While the invention has been described in conjunction with a screen curved only horizontally, it would be possible to have the screen surface vertically curved somewhat also. This curving would be approximately about the point 10 as a center. However, since the screen dimension in the vertical direction is materially less than in the horizontal direction where wide angle cinematography is concerned little advantage is to be gained by the use of such a concave curvature in the vertical direction of the screen to work with the horizontal curvature thereof. Instead, some curvature in the vertical direction less than that occurring in a true figure of revolution is sometimes useful, especially to correct the curvature of the images of straight vertical objects near the right and left edges of the screen. If desired, some advantage may be gained by merely "pulling in" the upper outer edges or corners of the wide angle screen.

Thus, it will be seen that careful consideration of the amount of distortion introduced by a camera lens system at the point 10 when a picture is being taken, in accordance with the distance to be subsequently employed for projection of such pictures, in accordance with projection systems to be used therewith, and in accordance with the curvature to be provided in the viewing screen, wide angle pictures may be provided for an audience seated in an area of appreciable size surrounding point 10, the optical center of the theatre, and which pictures will be well corrected for distortion.

Where reference has been made throughout the present disclosure to wide angle photography and wide angle projection systems, it should be appreciated that this refers to the pictures as viewed by the observer located at center point 10 and is intended to include in a horizontal direction a view of from approximately 90° to approximately 160° and even more. It will be readily appreciated that such a wide field angle approaches the limits of side vision of a person and accordingly the nearer the scene being observed approaches to such limits, the greater will be the depth effect being created.

While a distortion controlled camera lens system has been disclosed in detail, it will be appreciated that other lens systems of differing optical designs could as satisfactorily be used in carrying out the principles of the present invention as the one disclosed, as long as the distortional characteristics thereof are carefully controlled to work with a selected projector, selected projection distance and selected curved screen design. It will be noted, however, in systems embodying the invention that the lineal lateral dimension of the irregularly curved viewing screen will be proportioned in accordance with the camera lens system intended to function therewith and will be, for example, with a 90 degree wide angle camera system approximately equal to 1½D, for a 120 degree wide angle system equal to approximately 2D, and for a 150 degree wide angle system approximately equal to 2½D.

The above-described composite system is subject to numerous modifications and variations and therefore I do not wish to limit the scope of my invention except as defined in the appended claims.

Having described my invention, I claim:

1. A moving picture theater system comprising a single film having wide angle film images thereon, a single motion picture projector and a horizontally concavely curved viewing screen for producing pictures of a wide angle scene forwardly of a given commercial-type theater audience area of appreciable width and depth, said screen being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle objective of the camera used to photographically produce said wide angle film images, said single projector being located at a given known axial distance greater than D from the center of the screen and rearwardly of said predetermined point and having a lens system whose optical characteristics are controlled in accordance with the size of the film images on the film to be used in said projector for projecting said scene and in accordance with said projection distance so as to project said film images onto said screen throughout the major portion of the area of said screen and further controlled to have distortional characteristics jointly cooperating with the distortional characteristics of the photographed image as produced on the film in said projector so as to provide in the group of image-forming light rays being projected toward said viewing screen predetermined amounts of inward radial compression, considered along the horizontal center line thereof, which compression progressively increases in value from zero at the center of said group of projected light rays to a controlled maximum value at the opposite side edges of said projected light rays as compared with progressively laterally expanded light rays which would result from the use of a camera lens system and projection lens system which are distortion-free, with the result, that if many small like objects were disposed horizontally along the center line of the wide angle scene and throughout said wide angle and at equal distances from the camera during the photographing thereof, and if said photographed scene were thereafter projected by said projector onto a conventional flat screen at said projection distance from said projector, images of said small objects in the projected picture on said flat screen near the side edges thereof and to individuals in said audience area and spaced from said predetermined point would appear materially distorted, said screen having a concave curvature along its horizontal center line facing the theater audience area which is more strongly curved than if its curvature were generated about the projector location as its center and said screen being further of a shape so controlled in accordance with said projection distance that the unit surface areas thereof which receive the projected light rays producing said respective picture images of said small objects will be obliquely angled relative to said rays by increasing angular values which elongate said images by progressively increasing amounts in a direction outwardly from the center of said screen to the opposite side edges thereof, and which elongations will substantially compensate for the progressive horizontal compressions of said light rays forming said respective picture images of said small objects on said unit surface areas so that if said images are viewed from said predetermined point they will appear to be substantially distortion-free and if viewed from said audience area in general they will appear well corrected for distortion.

2. A motion picture theater system comprising a single film having film images thereon, a single motion picture projector and a horizontally concavely curved viewing screen for producing pictures of a wide angle scene forwardly of a given commercial-type theater audience area of appreciable width and depth, said screen being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle of the camera photographing said wide angle scene on film, said film having its images formed by a single camera having a wide angle lens system whose optical components have introduced therein controlled inward radial distortions which, when photographing a scene having horizontally equally spaced small objects of the same size and located at equal distances from the camera along the horizontal center line of said scene, will produce lateral compressions in the images of said objects along the horizontal center line of the film which progressively increase predetermined amounts from a zero value at the center of said film to a controlled maximum compression value at the opposite side edges thereof as compared with the progressively laterally expanded images which would result if said small objects were photographed by a distortion-free camera lens system, said single projector being located at a given known axial distance greater than D from the center of the screen and rearwardly of said predetermined point and having a lens system whose optical characteristics are so controlled as to be substantially distortion-free as to radial compression of image-forming rays projected thereby and further controlled in accordance with the size of the film images on the film to be used in said projector for projecting said scene and in accordance with said projection distance so as to project said film images onto said screen throughout the major portion of the area of said screen, and said screen having a concave curvature along its horizontal center line facing the theater audience area which is more strongly curved than if its curvature were generated about the projector location as its center and said screen being further of a shape controlled in accordance with said projection distance so that the unit surface areas which receive the projected light rays producing said respective picture images of said small objects will be obliquely angled relative to said rays by increasing angular values which elongate said picture images by progressively increasing amounts in a direction outwardly from the center of said screen to the opposite side edges thereof, and which elongations will function cooperatively with the progressive horizontal compressions of said light rays forming said respective picture images of said small objects on said unit surface areas so that if viewed from said predetermined point they will appear substantially distortion-free and if viewed from said audience area in general they will appear well corrected for distortion.

3. A motion picture theater system comprising a single motion-picture projector, a film for use in said projector, said film having a series of wide angle film images thereon, and a horizontally concavely curved viewing screen forwardly of a given commercial type theater audience area of appreciable width and depth for displaying to said audience area picture images of a wide angle scene projected by said projector, said screen being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle objective of the camera used to photograph said wide angle scene and produce said wide angle film images, said wide angle objective being of such optical design as to introduce into each film image controlled amounts of inward radial distortion which progressively increase in value, considered along the horizontal center line of the image, from a zero distortional value at the center of the film image to a value of approximately 6 per cent distortion in the regions of the film image corresponding to the 30 degree regions of the object field, and to a value of approximately 15 per cent distortion in the regions of the film image corresponding to the 60 degree regions of the object field, with the result that if a scene including along the horizontal center line thereof a number of horizontally equally spaced small objects of the same size and located at equal distances from the camera is photographed, the images of said small objects on said film will be horizontally compressed as compared with the progressively laterally expanded images which would have resulted if said small objects had been photographed by a distortion-free camera lens system, said single projector being located at a given projection distance greather than D from the center of said screen on the concave side thereof and rearwardly of said predetermined point and having a lens system whose optical characteristics are so controlled as to be substantially distortion-free as to lateral compressions of the images projected thereby and further controlled in accordance with the size of the film images on the film to be used in said projector for projecting said scene and in accordance with said projection distance so as to project said film images onto said screen throughout the major portion of the area of said screen, the concave curvature of said screen, considered along its horizontal center line facing the theater audience area, being more strongly curved than if its curvature were generated about the projector location as its center and said screen being further of a shape controlled in accordance with the projection distance so that the unit surface areas thereof laterally spaced from the center of said screen and receiving the light rays from said projector for producing screen images of said small objects will be obliquely angled with respect to the rays being received thereby by increasing angular values which elongate the screen images of said small objects amounts which progressively increase as their distances outwardly from the center of said screen increase and which elongations will substantially compensate for the progressive horizontal compressions of said light rays forming said respective picture images of said small objects on said unit surface areas so that if viewed from said predetermined point they will appear substantially distortion-free and if viewed from said audience area in general they will appear well corrected for distortion.

4. A motion picture theater system comprising a single motion-picture projector, a film for use in said projector, said film having a series of film images of a wide angle scene thereon, and a horizontally concavely curved viewing screen forwardly of a given commercial type theater audience area of appreciable width and depth for displaying to said audience area picture images of said wide angle scene when projected thereon by said projector, said screen being of a width considerably greater than its height and equal to at least the width of the major portion of the front of said audience area, said theater system including a predetermined point spaced a distance D from the center of said screen and defining, with reference to the side edges of said screen, an included angle which is substantially equal to the angular value of the object field of the wide angle objective of the camera used to photograph said scene, said wide angle objective being of such optical design as to introduce into each film image controlled amounts of inward radial distortion which progressively increase in value, considered along the horizontal center line of the image, from a zero distortional value at the center of the film image to a value of approximately 6 percent distortion in the regions of the film image corresponding to the 30 degree regions of the object field, to a value of approximately 15 percent distortion in the regions of the film image corresponding to the 60 degree regions of the object field, to a value of approximately 27 percent distortion in the regions of the film image corresponding to the 90 degree regions of the object field, and to a value of approximately 43 percent distortion in the region of the film image corresponding to the 120 degree regions of the object field, with the result that if a scene including along the horizontal center line thereof a number of horizontally equally spaced small objects of the same size and located at equal distances from the camera is photographed, the images of said small objects on the film in the camera will be horizontally compressed as compared with the progressively laterally expanded images which would have resulted if said small objects had been photographed by a distortion-free camera lens system, said single projector being located at a given projection distance greater than D from the center of said screen on the concave side thereof and rearwardly of said predetermined point and having a lens system whose optical characteristics are so controlled as to be substantially distortion-free as to lateral compressions of the film images on the film to be used in said projector for projecting said scene and further controlled in accordance with the size of said film images and in accordance with said projection distance so as to project said film images onto said screen throughout the major portion of said screen, said screen, when considered along its horizontal center line facing the theater audience area, being more strongly curved than if its curvature were generated about the projector location as its center and said screen being further of a shape controlled in accordance with the projection distance so that the unit surface areas thereof laterally spaced from the center of said screen and receiving the light rays from said projector for producing screen images of said small objects will be obliquely angled with respect to the rays being received thereby by increasing angular values which elongate the screen images of said small objects amounts which progressively increase as their distances outwardly from the center of said screen increase, and which elongations will substantially compensate for the progressive horizontal compressions of said light rays forming said respective picture images of said small objects on said unit surface areas so that if viewed from said predetermined point they will appear substantially distortion-free and if viewed from said audience area in general they will appear well corrected for distortion.

5. A motion picture theater system comprising an audience area of appreciable width and depth, a viewing screen, said screen being horizontally concavely shaped along its horizontal center line relative to a given point in said theater system spaced a distance D from the center of said screen and simulating the center of perspective of a wide angle photographic scene to be viewed on said screen, said screen being of considerably greater width than its height and extending throughout the major portion of the forward width of said audience area, the forward edge of said audience area having its central portion located at a distance from the center of said screen equal to at least one-half the distance D, and having its opposite side front portions located at a distance from the respective sides of said screen substantially equal to at least one-third the distance D, a single motion picture projector disposed at a given distance greater than D from the center of said screen and arranged to project an image of said wide angle scene along a projection axis toward the center of said screen, said image being projected toward said screen filling substantially the entire horizontal dimension of said concavely shaped screen and possessing progressively different controlled amounts of inward radial distortion at different locations along its horizontal center line ranging from a zero value at the center thereof to a value of at least 15% at its opposite side edges, said screen having along its horizontal center line a curvature which is more strongly curved than if same were generated about the projector location as its center, and said screen curvature being furthermore so controlled in accordance with said projector location that unit surface areas of said screen receiving the image-forming light rays from said projector will be obliquely angled relative to said rays by amounts which are such as to elongate the screen image being formed by progressively increasing amounts in a direction outwardly from the center of said screen to the opposite side edges thereof, and which elongations largely compensate for the progressive amounts of inward radial distortion of said light rays directed toward said screen, said different distortions of said image being projected onto said screen combined with said horizontal concave shape of said screen and the distance of said single projector from said screen causing the picture image on said screen along the horizontal center line thereof to appear to individuals within the defined audience area and forwardly of the projector to have relative to said small objects in said photographed scene no greater than a 30% distortion.

6. A motion picture theater system comprising a single film having film images thereon, a single motion picture projector and a horizontally concavely curved viewing screen for producing pictures of a wide angle scene forwardly of a given commercial type theater audience area of appreciable width and depth, said screen being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle of the camera photographing said wide angle scene on film in said camera, said film having its images formed by a single camera having a wide angle lens system whose optical components have introduced therein controlled inward radial distortions which, when photographing a scene having horizontally equally spaced small objects of the same size and located at equal distances from the camera along the horizontal center line of said scene, will produce lateral compressions in the images of said small objects along the horizontal center line of the film which progressively increase predetermined amounts from a zero value at the center of said film to a controlled maximum compression value at the opposite side edges thereof as compared with the progressively laterally expanded images which would result if said small objects were photographed by a distortion-free camera lens system, whereby the images of said equally spaced small objects of the same size progressively decrease controlled amounts in lateral dimensions from the center to the side edges of the film, said single projector being located at a given known axial distance greater than D from the center of the screen and rearwardly of said predetermined point and having a lens system whose optical characteristics are so controlled as to be substantially distortion-free as to lateral compressions of images projected thereby and further controlled in accordance with the size of the film images on the film to be used in said projector for projecting said scene and in accordance with said projection distance so as to project said film images onto said screen throughout the major portion of the area of said screen, and said screen having a horizontal concave curvature along the horizontal center line thereof which is such that its surface areas receiving said respective projected images of said small objects will effectively pass through the points of intersection of the central rays of said projected images of said small objects and the corresponding central rays from their respective small objects to the camera lens system, whereby the unit surface areas which receive the projected light rays producing said respective picture images of said small objects will be obliquely angled relative to said rays by increasing angular values which elongate said picture images by progressively increasing amounts in a direction outwardly from the center of said screen to the opposite side edges thereof, and which elongations will substantially compensate for the progressive horizontal compressions of said light rays forming said respective picture images of said small objects on said unit surface areas so that if viewed from said predetermined point they will appear substantially distortion-free and if viewed from said audience area in general they will appear well corrected for distortion.

7. A motion picture theater system for producing wide angle picture images on a viewing screen forwardly of a commercial-type theater audience area of appreciable width and depth, said system comprising a single film having film images thereon resulting from a camera having a wide angle objective, a horizontally concavely curved viewing screen disposed in front of said audience area being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle of the camera objective resulting in said images on said film, and a projector located at a given projection position a known projection distance greater than D from the center of said screen on the concave side thereof, said projection position being materially rearwardly of said predetermined point and centrally located with reference to said screen, said predetermined point simulating approximately the location at which said camera was located and the direction in which the camera was pointed while photographing said wide angle scene, the optical characteristics of said camera and its lens system and of said projector and its objective combined being such as to provide, in the group of image-forming light rays being projected toward said screen from film in said projector, predetermined amounts of inward radial compression when considered along the horizontal center line thereof, and which compression progressively increases in value from a zero value at the center of said group of said projected rays to a maximum value at the opposite side edges of said projected rays as compared with images if produced by projected rays resulting from the use of a camera and projector having distortion-free lens systems, with the result that, if many small objects of like size and shape were dispersed horizontally throughout said scene and at equal distances from the camera during the photographing of said scene and if said scene were thereafter projected by said projector onto a conventional flat screen at said projection distance from said projector, the images of said small objects near the center of said flat screen would appear substantially distortion-free while other images of said small objects nearer the opposite side edges of the screen would appear materially distorted to a person at said predetermined point, the horizontal concave curvature of said viewing screen of said system being such as to substantially intercept a horizontally disposed series of closely spaced points simulating the points of intersection of the central rays from said small objects to the camera lens along the horizontal center line of said photographed scene and the central rays corresponding thereto traveling from the film images of said small objects being projected by said projector onto said screen, whereby any scene photographed by said camera and projected by said projector from said projection position onto said concavely curved screen will provide, in objects disposed along the horizontal center line of said picture image on said curved screen, horizontal dimensional characteristics which if viewed by persons located near said predetermined point will appear substantially distortion-free and if viewed from said audience area in general will be well corrected for distortion.

8. A motion picture theater system comprising a single film having film images thereon, a single motion-picture projector and a horizontally concavely curved viewing screen for producing pictures of a wide angle scene forwardly of a given commercial-type theater audience area of appreciable width and depth, said screen being of a width considerably greater than its height and equal to at least the width of the major portion of the front of said audience area, said theater system including a predetermined point spaced a distance D from the center of said screen defining, with reference to the side edges of said screen, an included angle which is substantially equal to the wide angle of the camera photographing said wide angle scene on film, said film having its images formed by a single camera having a wide angle lens system whose optical components have introduced therein controlled inward radial distortions which, when photographing a scene having horizontally equally spaced small objects of the same size and located at equal distances from the camera along the horizontal center line of said scene, will produce lateral compressions in the images of said small objects along the horizontal center line of the film which progressively increase predetermined amounts from a minimum value at the center of said film to a controlled maximum compression value at the opposite side edges thereof as compared with the progressively laterally expanded images which would result if said small objects were photographed by a distortion-free camera lens system, said introduced distortion increasing from a zero value at the center of the film to a value of approximately 6% distortion in the regions of the film image corresponding to 30° regions of the object field and to a value of approximately 15% distortion in the regions of the film image corresponding to the 60° regions of the object field, whereby the images of said equally spaced small objects of the same size progressively decrease controlled amounts in lateral dimensions from the center to the side edges of the film, said single projector being located at a given known axial distance greater than D from the center of the screen and rearwardly of said predetermined point and having a lens system whose optical characteristics are so controlled as to be substantially distortion-free as to radial compression of image-forming rays projected thereby and further controlled in accordance with the size of the film images on the film to be used in said projector for projecting said scene and in accordance with said projection distance so as to project said film images onto said screen throughout the major portion of the area of said screen, and said screen having a concave curvature along its horizontal center line facing the theater audience area which is more strongly curved than if its curvature were generated about the projector location as its center and said screen being further of a shape controlled in accordance with said projection distance so that the unit surface areas which receive the projected light rays producing said respective picture images of said small objects will be obliquely angled relative to said rays by increasing angular values which elongate said picture images by progressively increasing amounts in a direction outwardly from the center of said screen to the opposite side edges thereof, and which elongations will substantially compensate for the progressive horizontal compressions of said light rays forming said respective picture images of said small objects on said unit surface areas so that if viewed from said predetermined point they will appear substantially distortion-free and if viewed from said audience area in general they will appear well corrected for distortion.

9. The method of producing a system for displaying wide angle motion pictures well corrected for distortion to persons within a given commercial-type theatre which includes an audience area of appreciable width and depth, comprising photographically recording a wide angle scene on film through the use of a single camera having a wide angle lens system whose optical components have introduced therein inward radial distortions which, if said scene includes along the horizontal center line thereof a number of horizontally equally spaced small objects of the same size and located at equal distances from the camera, the images of said small objects, as recorded on the camera film, will be horizontally compressed from a zero value at the center of said scene to a maximum compression value at the opposite side edges thereof as compared with the progressively laterally expanded images which would result if said small objects were photographed by a distortion-free camera lens system, forming a horizontally concavely curved viewing screen of an appreciable width as compared to its height forwardly of the theatre audience area and to a width equal to at least the width of the major portion of the front of said audience area and located at a distance D from a predetermined point in said system which defines, with reference to the side edges of said screen, an included angle which is substantially equal to the wide angle of the camera used in photographing said wide angle scene, locating a single projector, having a projection lens system with optical characteristics so controlled as to be well corrected as to radial compression of the image-forming rays projected thereby, at a given known axial distance greater than D from the center of the screen and rearwardly of said predetermined point in accordance with the size of the images on the film to be used in said projector for projecting said scene and which film has horizontally compressed images thereon of the same character as the images of said photographed film, and controlling the concave curvature of said screen along its horizontal center line in accordance with said projection distance so that its unit surface areas which receive the projected rays producing said respective picture images of said small objects will be obliquely angled relative to said rays by increasing angular values which elongate said picture images by progressively increasing amounts outwardly from the center of the screen to the opposite side edges thereof, whereby said elongations will function cooperatively with the horizontal compressions of said light rays forming said respective picture images of said small objects on said unit surface areas so that if the resultant scene as produced on the screen is viewed from said predetermined point it will appear substantially distortion-free and if viewed from said audience area in general it will appear well corrected for distortion.

References Cited in the file of this patent

UNITED STATES PATENTS

| | | |
|---|---|---|
| 1,330,447 | Pech | Feb. 10, 1920 |
| 1,482,503 | Ames | Feb. 5, 1924 |
| 2,037,017 | Gardner | Apr. 14, 1936 |
| 2,157,138 | Mendez | May 9, 1939 |
| 2,273,074 | Waller | Feb. 17, 1942 |
| 2,280,206 | Waller et al. | Apr. 21, 1942 |
| 2,299,682 | Conant | Oct. 20, 1942 |
| 2,476,521 | Waller | July 19, 1949 |
| 2,542,789 | Ames | Feb. 20, 1951 |

OTHER REFERENCES

"Taking and Projecting Motion Pictures," Hardy et al., vol. 12, No. 33, pages 117–125 (1928).

"Widening Field of Camera Lenses," Dain, vol. 19, pages 522–527, December 1932.

"Distortion in Motion Pictures," Tuttle, vol. 21, pages 198–208, September 1933.

"Shape, Area, and Techni(?) Pictures," Schlanger, vol. 24, pages 402–409, May 19(?).

"Theatre Shape and Visual Reception," Schlanger, vol. 26, pages 128–135, February 1936.